United States Patent
Sich et al.

[19]

[11] Patent Number: 6,131,468

[45] Date of Patent: Oct. 17, 2000

[54] PRESSURE TRANSDUCER ADAPTER

[75] Inventors: Gary M. Sich, Irwin; Michael McNeil, White Oak, both of Pa.

[73] Assignee: Westinghouse Air Brake Company, Wilmerding, Pa.

[21] Appl. No.: 09/108,395

[22] Filed: Jul. 1, 1998

[51] Int. Cl.[7] ........................................... G01L 7/00
[52] U.S. Cl. .................................................... 73/756
[58] Field of Search ............................. 73/706, 707, 708, 73/715, 716, 717, 718, 719, 720, 721, 722, 723–731, 756; 137/269, 271, 545, 884

[56] References Cited

U.S. PATENT DOCUMENTS

| | | | |
|---|---|---|---|
| 4,581,941 | 4/1986 | Obermann et al. | 73/728 |
| 4,586,383 | 5/1986 | Blomquist | 73/706 |
| 5,063,784 | 11/1991 | Ridenour | 73/756 |
| 5,337,612 | 8/1994 | Evans | 73/729.1 |
| 5,693,887 | 12/1997 | Englund et al. | 73/723 |
| 5,810,031 | 9/1998 | Evans et al. | 137/557 |

*Primary Examiner*—William Oen
*Attorney, Agent, or Firm*—James Ray & Associates

[57] ABSTRACT

The present invention provides an adapter member for attaching a pressure transducer to a housing member which has a fluid pressure communication passageway. The pressure transducer has a threaded fitting having a fluid pressure communication passageway for connection to a fluid communication line, such as an air hose. The pressure transducer has a mounting arrangement for attachment to a surface, such as a panel. The adapter member has a first body portion having a threaded fitting for mating with the threaded fitting of the pressure transducer and the adapter member has a fluid pressure communication passageway. A portion of the adapter member has an axisymmetric external surface portion for sealing against an inner surface of the fluid pressure communication passageway in the housing member.

20 Claims, 4 Drawing Sheets

PRESSURE TRANSDUCER ADAPTER

FIELD OF THE INVENTION

The present invention relates, in general, to an adapter for mounting a low profile pressure transducer to a housing member and, more particularly, the instant invention relates to an adapter for mounting a low profile pressure transducer to a housing member used in a railway car airbrake system.

BACKGROUND OF THE INVENTION

The well known railway car airbrake system, as developed from the Westinghouse airbake, has basically been an all pneumatically operated brake system. Recently, however, various improvements have been incorporated in the brake system which improvements involve the use of electrical pressure sensors, electrically controlled valves, etc.

For example, the modern brake system may have an end-of-train unit which may open or close valves to exhaust brakepipe pressure for a service brake application or an emergency brake application. An end-of-train unit has one or more transducers for measuring the brakepipe air pressure. An end-of-train unit may be connected for communication with the lead locomotive by way of a radio link or by trainline cables which are connected from railway car to railway car along the length of the train.

As is well known, transducers which convert a pressure signal into an electrical signal are available in two general types. One type is for mounting on a housing and includes a cylindrical body and a male pipe fitting concentric with the axis of the cylindrical body. Such male pipe fitting is threaded into the housing by rotation about its axis and is sealed, to prevent air loss, by a sealant placed on the pipe threads. These prior art transducers generally have a length that is greater than their diameter and they require a significant amount of space.

Another type of transducer is produced in the form of a low profile rectangular block. This transducer is normally mounted flat on a panel by screws. It has a male pipe fitting which fits through a hole on the panel, so that a hose having a female pipe fitting on its end may be attached to it. In an environment having relatively limited space, this type of prior art transducer may not be able to be mounted on a housing because it needs to be rotated to be connected and its rectangular form could interfere with nearby components.

SUMMARY OF THE INVENTION

In a first aspect, the present invention provides an adapter for attaching a pressure transducer to a housing member which has a first fluid pressure communication passageway. The transducer has a first threaded fitting having a second fluid pressure communication passageway for connection to a fluid communication line, such as an air hose. The transducer includes a mounting means for attachment to a surface, such as a panel. The adapter has a first body portion having a second threaded fitting and a third fluid pressure communication passageway for mating with the first threaded fitting of the transducer to connect the third fluid pressure communication passageway to the second fluid pressure communication passageway.

The first body portion of the adapter has at least one exterior surface for application of a tool such as a wrench for connecting the second threaded fitting of the adapter to the first threaded fitting of the pressure transducer. The adapter also has a second body portion connected to the first body portion, the second body portion having a fourth fluid pressure communication passageway connected to the third fluid pressure communication passageway of the first body portion. The second body portion has an axisymmetric external surface portion for sealing against an inner surface of the first fluid pressure communication passageway.

In another aspect, the invention provides a transducer assembly for attachment to a housing for measurement of pressure in a first fluid pressure communication passageway disposed in the housing. The transducer assembly includes a pressure transducer having mounting means for attachment to a surface, such as a panel. It has a first threaded fitting having a second fluid pressure communication passageway. The assembly also includes an adapter having a first body portion having a second threaded fitting and a third fluid pressure communication passageway for mating with the first threaded fitting of the transducer to connect the third fluid pressure communication passageway to the second fluid pressure communication passageway. The adapter further includes at least one exterior surface disposed on the first body portion for application of a tool, such as a wrench, for connecting the second threaded fitting of the adapter to the first threaded fitting of the pressure transducer. In addition, the adapter includes a second body portion connected to the first body portion, the second body portion having a fourth fluid pressure communication passageway connected to the third fluid pressure communication passageway of the first body portion. The second body portion is provided with an axisymmetric external surface portion for sealing against an inner surface of the first fluid pressure communication passageway of the housing.

In a further aspect, the prevent invention provides a fluid pressure communication assembly which includes a housing having a first fluid pressure communication passageway wherein pressure is to be measured. It also includes a pressure transducer attached to a surface of the housing, the transducer having a first threaded fitting having a second fluid pressure communication passageway.

The assembly further includes an adapter having a first body portion with a second threaded fitting and a third fluid pressure communication passageway for mating with the first threaded fitting of the transducer to connect the third fluid pressure communication passageway to the second fluid pressure communication passageway. The housing has a cavity communicating with the first fluid pressure communication passageway. The cavity is formed to provide space for the first threaded fitting of the transducer and the adapter.

There is at least one exterior surface disposed on the first body portion of the adapter for application of a tool, such as a wrench, for connecting the second threaded fitting of the adapter to the first threaded fitting of the pressure transducer.

The adapter also includes a second body portion connected to the first body portion. The second body portion having a fourth fluid pressure communication passageway connected to the third fluid pressure communication passageway of the first body portion. The second body portion is provided with an axisymmetric external surface portion for sealing against an inner surface of the first fluid pressure communication passageway in the housing.

OBJECTS OF THE INVENTION

It is, therefore, one of the primary objects of the present invention to provide an adapter for a low profile transducer which is intended to be mounted on a panel so that the low profile transducer can be mounted on a housing and make sealed pressure contact with a fluid pressure communication passageway in the housing.

Another object of the present invention is to provide an assembly consisting of a transducer and an adapter which does not need to be rotated for mounting on a housing so it does not interfere with other components attached to the housing during assembly or maintenance.

It is a further object of the present invention to provide a fluid pressure communication housing for an electropneumatic braking system which has a low profile transducer mounted on the surface of the housing in close proximity to solenoid valves of the braking system in which the low profile transducer does not require rotation to be mounted in place or removed for maintenance, since rotation of the transducer would interfere with nearby solenoid valves.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing Figures and with the appended claims.

Figure 1:
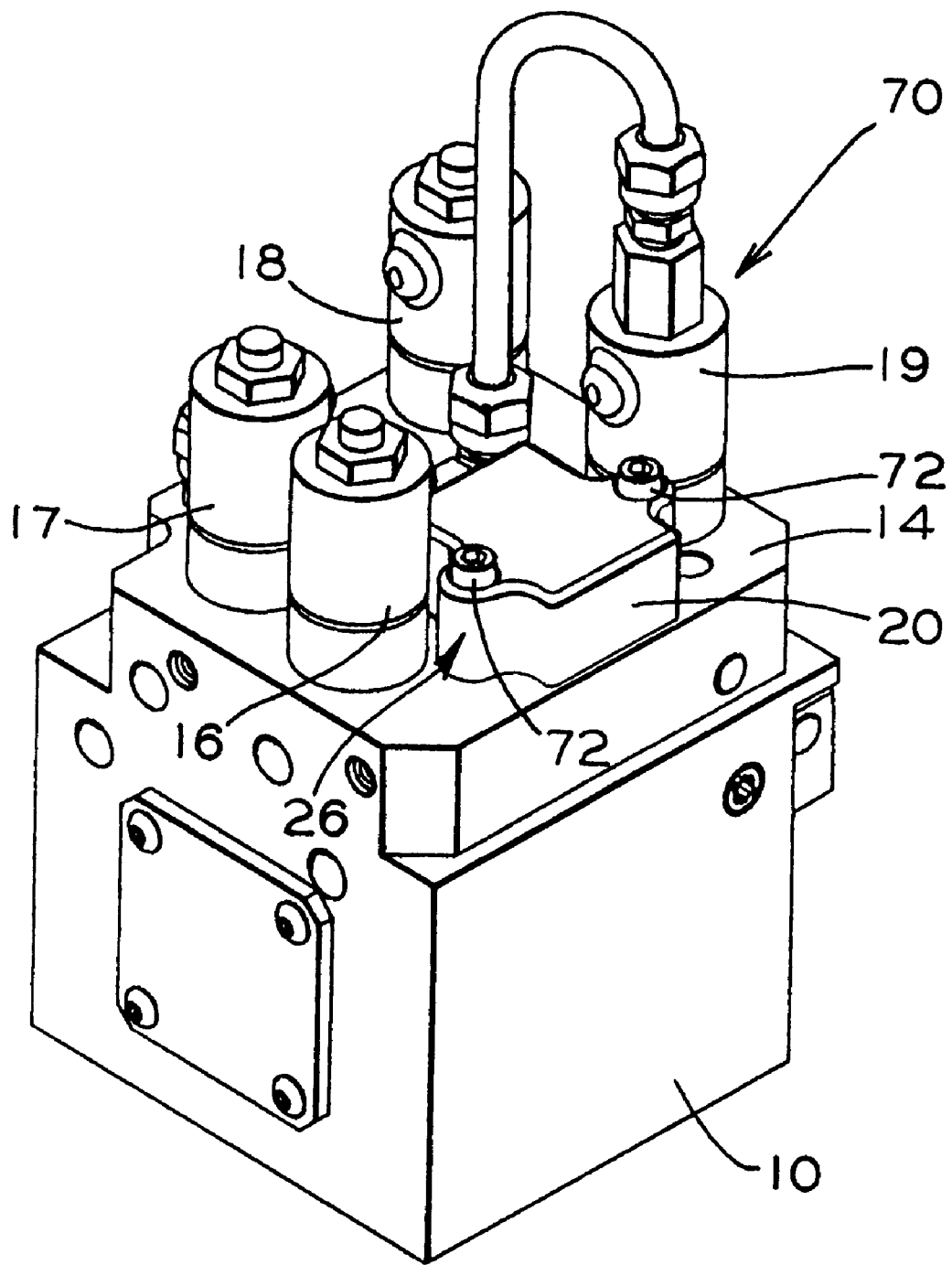
FIG. 1 is a perspective view of a presently preferred embodiment of a fluid pressure communication assembly having a low profile transducer mounted on the surface of a housing.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing Figures, for the sake of clarity and understanding of the invention.

Reference is now made, more particularly, to the drawing Figures which illustrate a presently preferred embodiment of the invention. Illustrated in FIG. 1 is a perspective view of a fluid pressure communication assembly, generally designated 70, which is part of an electropneumatic railway braking system. The fluid pressure communication assembly 70 includes a housing 10 with electropneumatic valves 16, 17, 18 and 19 disposed thereon which control the air pressure in such fluid pressure communication assembly 70. A pressure transducer 20 is mounted on a surface 14 of housing 10 in a relatively small space between these valves.

Figure 2B:
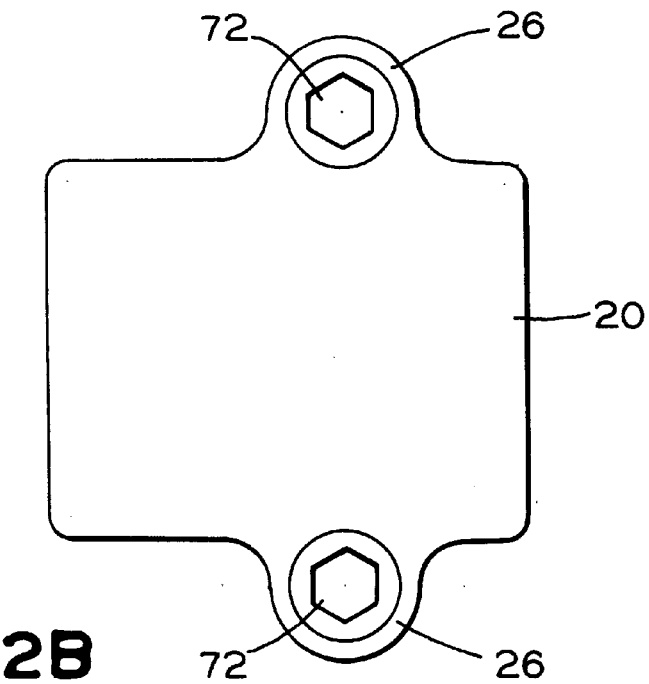
FIG. 2B is a top view of the low profile transducer.

A low profile transducer, such as the transducer shown, is used because of spacial constraints in the larger system in which the fluid pressure communication assembly 70 is mounted. Such pressure transducer 20 has a mounting means 26 (FIG. 2B), which accommodate mounting screws 72 that are threaded into threaded holes (not shown) in housing 10.

Figure 2A:
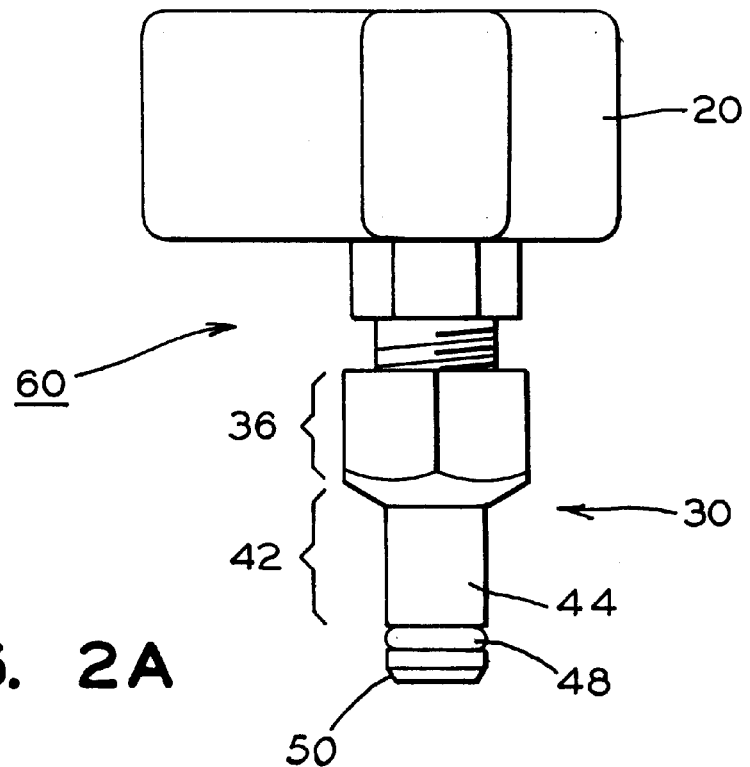
FIG. 2A illustrates the low profile transducer assembled to an adapter for providing sealed fluid pressure connection to a fluid pressure communication passageway in the housing.

As shown in the side view of FIG. 2A, the pressure transducer 20 is assembled to an adapter member 30. Such adapter member 30 includes a first body portion 36 and a second body portion 42. The second body portion 42 has an axisymmetric surface portion 44 in which an O-ring sealing member 48 is mounted. Such adapter member 30 includes a chamfer 50 which facilitates insertion of the adapter member 30 into the housing member 10.

Figure 3:
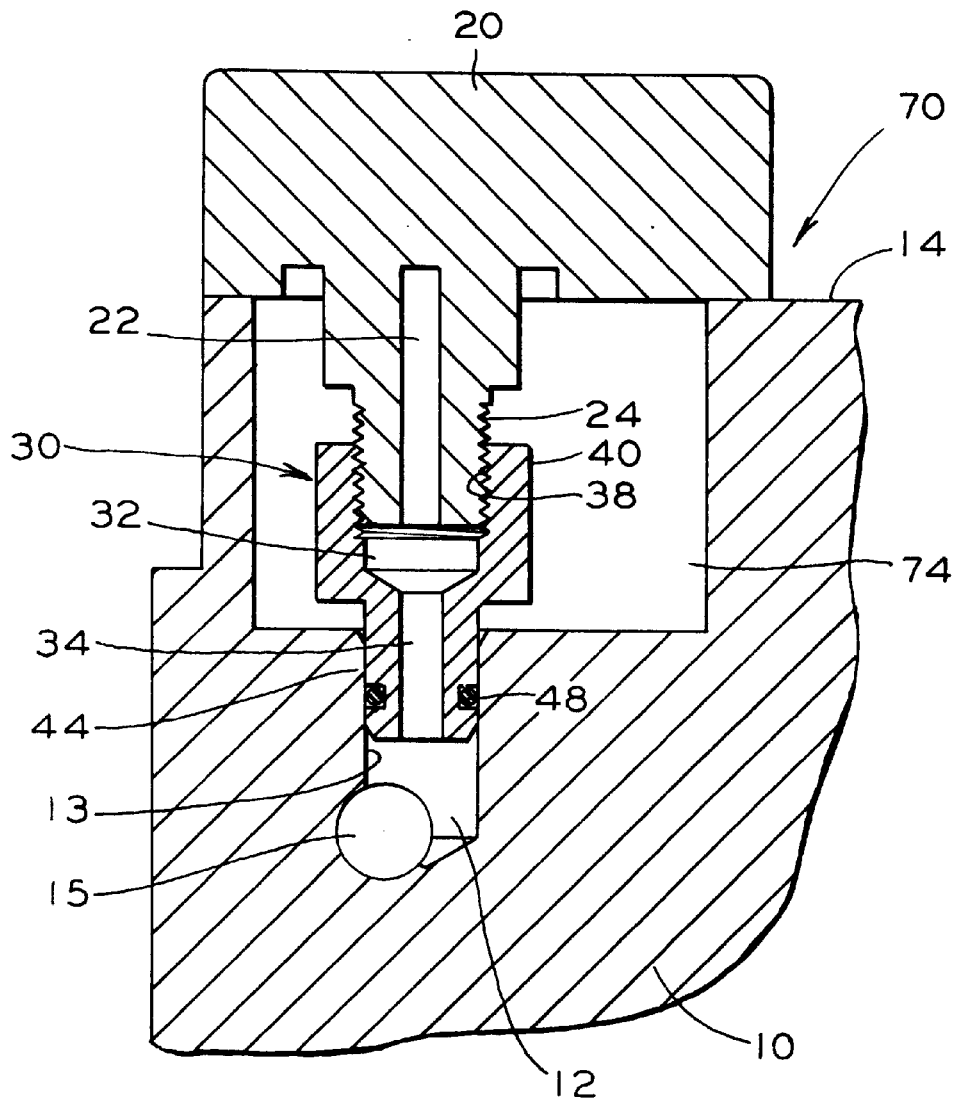
FIG. 3 is a cross-sectional view of the assembled housing, transducer, and adapter.

Refer now to FIG. 3 which is a cross-sectional view of the fluid pressure communication assembly 70 that is cut through such housing member 10, pressure transducer 20 and adapter member 30. As shown, there is a cavity 74 in housing member 10 which accommodates a first threaded fitting 24 of pressure transducer 20 and adapter member 30. There is a first fluid pressure communication passageway 12 provided in housing member 10. A portion 15 of the first fluid pressure communication passageway 12, in the embodiment shown, is oriented orthogonally to the plane of FIG. 3.

Also shown in FIG. 3, is a second fluid pressure communication passageway 22 in pressure transducer 20 and a third fluid pressure communication passageway 32 in adapter member 30 and a fourth fluid pressure communication passageway 34 in such adapter member 30. It is evident from FIG. 3 that there is fluid pressure communication provided between the first fluid pressure communication passageway 12 and second fluid pressure communication passageway 22 by such third and fourth pressure communication passageways 32 and 34, respectively, in adapter member 30.

A fluid seal is provided by an axisymmetric external surface portion 44 of second body portion 42 (FIG. 4C) against the inner surface 13 of first fluid pressure communication passageway 12. It is further evident in FIG. 3 that there is a first threaded fitting 24 provided on pressure transducer 20.

Figure 4A:
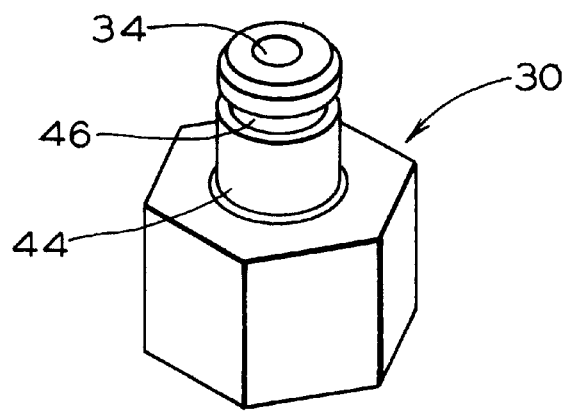
FIG. 4A is a perspective view of the adapter.

Reference is now made, more particularly, to FIGS. 4A–4E in which FIG. 4A is a perspective view of adapter member 30 with its orientation being inverted relative to its orientation as seen in FIGS. 2A and 3. FIG. 4A illustrates axisymmetric surface 44, groove 46 and a fourth fluid pressure communication passageway 34.

Figure 4B:
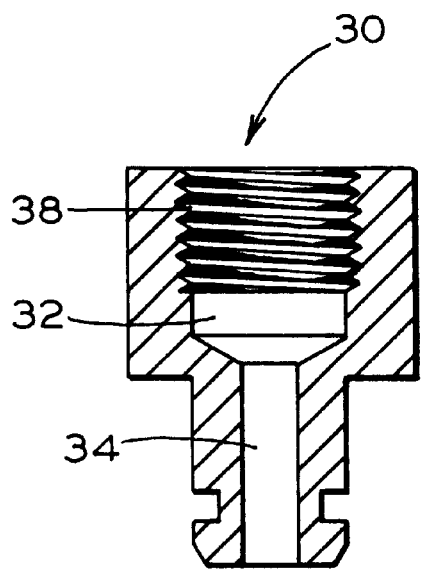
FIG. 4B is a cross-sectional view of the adapter.

FIG. 4B illustrates, in a cross-sectional view, the adapter member 30 having a third fluid pressure communication passageway 32 and fourth fluid pressure communication passageway 34. It also shows the second threaded fitting 38 formed in the third fluid pressure communication passageway 32.

Figure 4C:
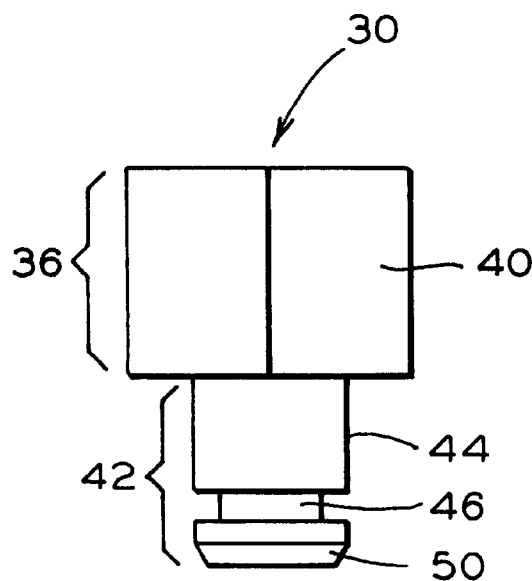
FIG. 4C is a side view of the adapter.

The adapter member 30 includes a first body portion 36 having an external surface 40, an axisymmetric surface portion 44, a groove 46 and a chamfer 50, all as clearly illustrated in the side elevation view of FIG. 4C. Disposed in groove 46 is an O-ring 48 which is shown in FIG. 4E.

Figure 4D:
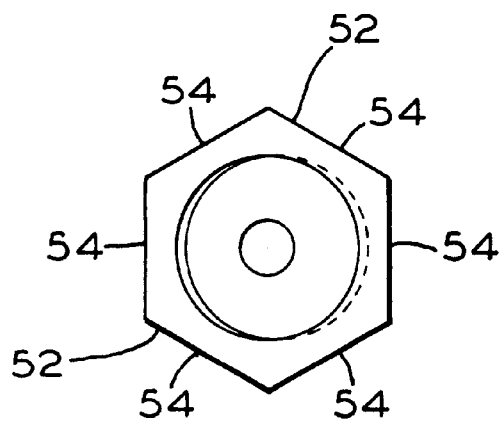
FIG. 4D is an end view of the adapter.
Figure 4E:
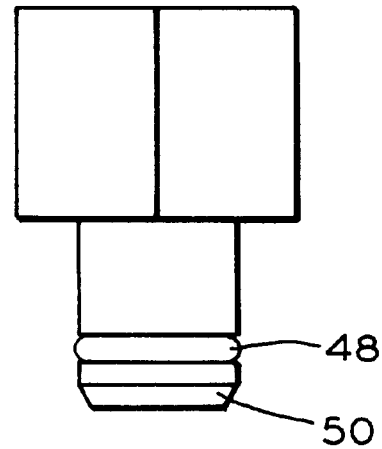
FIG. 4E is a side view of the adapter with an O-ring mounted in a groove in the external surface of the adapter.

FIG. 4D is an end view of the adapter member 30 with the axisymmetric portion 42 disposed away from the observer. As seen in this Figure, adapter member 30 further includes a pair of parallel flat surfaces 52 and, preferably, three pairs of parallel surfaces denoted 54 that enable application of a tool, such as a wrench, for assembling adapter member 30 to pressure transducer 20.

Now, discussing the invention more broadly, there is disclosed in a first aspect, an adapter member 30 for attaching a pressure transducer 20 to a housing member 10 which has a first fluid pressure communication passageway 12. The pressure transducer 20 includes a first threaded fitting portion 24 having a second fluid pressure communication passageway 22 for connection to a fluid communication line, such as an air hose. The such pressure transducer 20 further includes a mounting means 26 for attachment to a predetermined surface, such as a panel.

The adapter member 30 includes a first body portion 36 having a second threaded fitting portion 38 and a third fluid pressure communication passageway 32 for mating with the first threaded fitting portion 24 of the pressure transducer 20 to connect the third fluid pressure communication passageway 32 to the second fluid pressure communication passageway 22.

The first body portion 36 of the adapter member 30 has at least one exterior surface 40 for application of a tool, such as a wrench, to enable connecting the second threaded fitting portion 38 of the adapter member 30 to the first threaded fitting portion 24 of the pressure transducer 20.

Such adapter member 30 also includes a second body portion 42 connected to the first body portion 36, the second body portion 42 has a fourth fluid pressure communication passageway 34 connected to the third fluid pressure communication passageway 32 of the first body portion 36. The second body portion 42 has an axisymmetric external surface portion 44 for sealing against an inner surface 13 of the first fluid pressure communication passageway 12.

The axisymmetric external surface portion 44, preferably, includes a groove 46 having an O-ring 48 disposed therein. The second body portion 42 of the adapter member 30 also, preferably, includes a chamfer 50 at one end thereof to facilitate insertion of the second body portion 42 of the adapter member 30 into the first fluid pressure communication passageway 12 of housing member 10.

The second threaded fitting 38 of the adapter member 30 may be, for example, a female pipe thread to mate with a male pipe thread on the pressure transducer 20. The exterior surface 40 on the first body portion 36 of the adapter member 30, preferably, includes at least a pair of parallel flat surfaces 52 on opposite sides of the fist body portion 36. The exterior surface 40 may have three or more pairs of parallel flat surfaces 54 meeting at equal angles to form a hexagonal exterior.

In another aspect, the present invention provides a pressure transducer assembly for attachment to a housing member 10 for measurement of pressure in a first fluid pressure communication passageway 12 disposed in the housing member 10. The pressure transducer assembly includes a pressure transducer 20 having a mounting means 26 for attachment to a predetermined surface (not shown), such as a panel. Pressure transducer 20 includes a first threaded fitting portion 24 having a second fluid pressure communication passageway 22.

The assembly further includes an adapter member 30 which has a first body portion 36. Such first body portion 36 includes a second threaded fitting portion 38 and a third fluid pressure communication passageway 32. This second threaded fitting portion 38 that mates with the first threaded fitting portion 24 of the pressure transducer 20 to connect the third fluid pressure communication passageway 32 to the second fluid pressure communication passageway 22.

The adapter member 30 also includes at least one exterior surface 40 disposed on the first body portion 36 for application of a tool, such as a wrench, for connecting the second threaded fitting portion 38 of the adapter member 30 to the first threaded fitting portion 24 of the pressure transducer 20. The adapter member 30 also has a second body portion 42 connected to the first body portion 36. The second body portion 42 has a fourth fluid pressure communication passageway 34 connected to the third fluid pressure communication passageway 32 of the first body portion 36.

The second body portion 42 includes an axisymmetric external surface portion 44 for sealing against an inner surface 13 of the first fluid pressure communication passageway 12 of the housing member 10. The axisymmetric external surface portion 44 may include an O-ring disposed in a groove 46.

The first threaded fitting portion 24 of the pressure transducer 20 may, for example, be a male pipe thread and the second threaded fitting portion 38 of the adapter member 30 may be a compatible female pipe fitting.

The external surface on the first body portion 36 of the adapter member 30, for application of a tool for connecting the second threaded fitting portion 38 of the adapter member 30 to the first threaded fitting portion of the pressure transducer 20, may be at least a pair of parallel flat surfaces disposed on opposite sides of the first body portion 36. Three pairs of parallel flat surfaces 54 meeting at equal angles to form a hexagonal exterior may be used.

In a further aspect, the present invention provides a fluid pressure communication assembly, generally designated 70. Such assembly 70 includes a housing member 10 which has a first fluid pressure communication passageway 12 therein which requires the pressure to be measured. Assembly 70 also includes a pressure transducer 20 attached to a surface of the housing member 10. The pressure transducer 20 has a first threaded fitting portion 24 in which a second fluid pressure communication passageway 22 is provided.

The assembly 70 has an adapter member 30 having a first body portion 36 having a second threaded fitting portion 38 and a third fluid pressure communication passageway 32 for mating with the first threaded fitting portion 24 of the pressure transducer 20 to connect the third fluid pressure communication passageway 32 to the second fluid pressure communication passageway 22. The housing member 10 has a cavity 74 in fluid communication with the first fluid pressure communication passageway 12. The cavity 74 is formed to provide space for the first threaded fitting portion 24 of the pressure transducer 20 and the adapter member 30.

There is at least one exterior surface 40 disposed on the first body portion 36 of the adapter member 30 which accepts a tool, such as a wrench, for connecting the second threaded fitting portion 38 of the adapter member 30 to the first threaded fitting portion 24 of the pressure transducer 20. The adapter member 30 also has a second body portion 42 connected to the first body portion 36. Such second body portion 42 has a fourth fluid pressure communication passageway 34 connected to the third fluid pressure communication passageway 32 of the first body portion 36. The second body portion 42 includes an axisymmetric external surface portion 44 for sealing against an inner surface 13 of the first fluid pressure communication passageway 12 in such housing member 10.

The axisymmetric external surface portion 44 may include a groove 46 for an O-ring 48, and an O-ring 48 may be placed in the groove 46. A chamfer 50 may be formed on the second body portion 42 of the adapter member 30 to facilitate insertion into first fluid pressure communication passageway 12.

The first threaded fitting portion 24 of the pressure transducer 20 may be a male pipe thread and the second threaded fitting portion 38 of the adapter member 30 may be a female pipe thread.

The external surface on the first body portion 36 of the adapter member 30 may include at least one pair of parallel flat surfaces 52 disposed on opposite sides of such first body portion 36. The at least one pair of parallel flat surfaces 52 may be three pairs of parallel flat surfaces 54 meeting each other at equal angles to form a hexagonal exterior.

While a presently preferred and various additional alternative embodiments of the instant invention have been described in detail above in accordance with the patent statutes, it should be recognized that various other modifications and adaptations of the invention may be made by those persons who are skilled in the relevant art without departing from either the spirit of the invention or the scope of the appended claims.

We claim:

1. An adapter apparatus for attaching a pressure transducer to a housing member having a first fluid pressure communication passageway formed therein, such pressure transducer including a first connection means having a second fluid pressure communication passageway for connection to a fluid communication line, at least a portion of such pressure transducer being engageable with and attachable to a predetermined surface, said adapter apparatus comprising:

a first body portion having a second connection means, having a third fluid pressure communication passageway, for connection with such first connection means of such pressure transducer to connect said third fluid pressure communication passageway to such second fluid pressure communication passageway; and a second body portion of said adapter member connected to said first body portion, said second body portion having a fourth fluid pressure communication passageway connected to said third fluid pressure communication passageway of said first body portion, said second body portion having an axisymmetric external surface portion for sealing against an inner surface of such first fluid pressure communication passageway.

2. An adapter apparatus, according to claim 1, wherein said axisymmetric surface portion for sealing against an inner surface of such first fluid pressure communication passageway includes a groove having an O-ring disposed therein.

3. An adapter apparatus, according to claim 1, wherein said second body portion of said adapter includes a chamfer adjacent one end thereof to facilitate insertion into such first fluid pressure communication passageway of such housing member.

4. An adapter apparatus, according to claim 1, wherein such first connection means and said second connection means are threaded fittings.

5. An adapter apparatus, according to claim 4, wherein said second threaded fitting of said adapter apparatus is a female pipe thread.

6. An adapter apparatus, according to claim 5, wherein said adapter apparatus further includes at least one exterior surface disposed on said first body portion of said adapter apparatus for cooperation with a tool for connecting said second threaded fitting of said adapter member to such first threaded fitting of such pressure transducer.

7. An adapter apparatus, according to claim 6, wherein said at least one exterior surface disposed on said first body portion of said adapter apparatus for cooperation with a tool for connecting said second threaded fitting of said adapter apparatus to such first threaded fitting of such pressure transducer is at least one pair of substantially parallel and substantially flat surfaces disposed on opposite sides of said first body portion.

8. An adapter apparatus, according to claim 7, wherein said at least one pair of said substantially parallel and substantially flat surfaces disposed on said opposite sides of said first body portion is three pairs of similar parallel flat surfaces meeting each other at about equal angles so that said first body portion has a hexagonal exterior.

9. A pressure transducer assembly engageable with a housing member for measurement of a fluid pressure present in a first fluid pressure communication passageway disposed in such housing member, said pressure transducer assembly comprising:

a pressure transducer having each of a first threaded fitting adjacent one side thereof and a second fluid communication passageway formed through said first threaded fitting;

means for mounting said pressure transducer to a predetermined surface;

an adapter member having a first body portion having each of a second threaded fitting and a third fluid pressure communication passageway for both mating with said first threaded fitting of said transducer and for connecting said third fluid pressure communication passageway to said second fluid pressure communication passageway;

at least one exterior surface disposed on said first body portion for cooperation with a tool for connecting said second threaded fitting of said adapter member to said first threaded fitting of said pressure transducer; and a second body portion connected to said first body portion, said second body portion having a fourth fluid pressure communication passageway connected to said third fluid pressure communication passageway of said first body portion, said second body portion having an axisymmetric external surface portion for sealing against an inner surface of such first fluid pressure communication passageway.

10. A pressure transducer assembly, according to claim 9, wherein said axisymmetric surface portion for sealing against said inner surface of such first fluid pressure communication passageway includes a groove having an O-ring disposed therein.

11. A pressure transducer assembly, according to claim 9, wherein said second body portion of said adapter member includes a chamfer disposed at one end thereof to facilitate insertion into such first fluid pressure communication passageway of such housing member.

12. A pressure transducer assembly, according to claim 9, wherein said first threaded fitting of said pressure transducer is a male pipe thread and said second threaded fitting of said adapter member is a female pipe thread.

13. A pressure transducer assembly, according to claim 9, wherein said at least one exterior surface disposed on said first body portion for cooperation with a tool for connecting said second threaded fitting of said pressure transducer assembly to such first threaded fitting of such pressure transducer is at least one pair of substantially parallel flat surfaces disposed on opposite sides of said first body portion.

14. A pressure transducer assembly, according to claim 13, wherein said at least one pair of said substantially parallel flat surfaces disposed on said opposite sides of said first body portion is three pairs of similar parallel flat surfaces meeting each other at about equal angles so that said first body portion has a hexagonal exterior.

15. A fluid pressure communication assembly, said fluid pressure communication assembly comprising:
- a housing member having a first fluid pressure communication passageway formed therein wherein a fluid pressure is to be measured;
- a pressure transducer attached to a predetermined surface of said housing member, said pressure transducer including a first threaded fitting having a second fluid pressure communication passageway formed therein;
- an adapter member including a first body portion having a second threaded fitting and a third fluid pressure communication passageway formed therein for mating with said first threaded fitting of said pressure transducer to connect said third fluid pressure communication passageway to said second fluid pressure communication passageway;
- a cavity formed in said housing member and communicating with said first fluid pressure communication passageway, said cavity formed to provide space for said first threaded fitting of said pressure transducer and said adapter member;
- at least one exterior surface disposed on said first body portion of said adapter member for cooperating with a tool for connecting said second threaded fitting of said adapter member to said first threaded fitting of said pressure transducer; and
- a second body portion of said adapter member connected to said first body portion, said second body portion having a fourth fluid pressure communication passageway connected to said third fluid pressure communication passageway of said first body portion, said second body portion having an axisymmetric external surface portion for sealing against an inner surface of said first fluid pressure communication passageway.

16. A fluid pressure communication assembly, according to claim 15, wherein said axisymmetric surface portion for sealing against said inner surface of said first fluid pressure communication passageway includes a groove having an O-ring disposed therein.

17. A fluid pressure communication assembly, according to claim 15, wherein said second body portion of said adapter member includes a chamfer disposed at one end thereof to facilitate insertion into said first fluid pressure communication passageway of said housing member.

18. A fluid pressure communication assembly, according to claim 15, wherein said first threaded fitting of said pressure transducer is a male pipe thread and said second threaded fitting of said adapter member is a female pipe thread.

19. A fluid pressure communication assembly, according to claim 15, wherein said at least one exterior surface disposed on said first body portion for cooperation with such tool for connecting said second threaded fitting of said assembly to said first threaded fitting of said pressure transducer is at least one pair of substantially parallel and substantially flat surfaces disposed on opposite sides of said first body portion.

20. A fluid pressure communication assembly, according to claim 19, wherein said at least one pair of said substantially parallel flat surfaces disposed on said opposite sides of said first body portion is three pairs of similar parallel flat surfaces meeting each other at about equal angles so that said first body portion has a hexagonal exterior.

* * * * *